US008568888B2

(12) United States Patent
Choate (10) Patent No.: US 8,568,888 B2
(45) Date of Patent: *Oct. 29, 2013

(54) DENDRITIC POLYURETHANE COATING

(75) Inventor: Thomas F. Choate, Pinckney, MI (US)

(73) Assignee: Nanovere Technologies, Inc., Brighton, MI (US)

( * ) Notice: Subject to any disclaimer, the term of this patent is extended or adjusted under 35 U.S.C. 154(b) by 1292 days.

This patent is subject to a terminal disclaimer.

(21) Appl. No.: 12/170,250

(22) Filed: Jul. 9, 2008

(65) Prior Publication Data

US 2009/0081373 A1    Mar. 26, 2009

Related U.S. Application Data

(63) Continuation-in-part of application No. 12/049,075, filed on Mar. 14, 2008, now Pat. No. 8,206,827.

(60) Provisional application No. 60/918,517, filed on Mar. 15, 2007.

(51) Int. Cl.
  *B32B 27/40* (2006.01)
  *B05D 3/00* (2006.01)
  *C09D 175/04* (2006.01)
  *C09D 175/06* (2006.01)

(52) U.S. Cl.
  USPC ......... 428/423.1; 427/385.5; 528/44; 528/45; 528/48; 528/58; 528/85

(58) Field of Classification Search
  USPC ............. 427/384, 385.5; 428/423.1; 525/450, 525/453; 528/44, 45, 48, 55, 58, 85
  See application file for complete search history.

(56) References Cited

U.S. PATENT DOCUMENTS

| | | | |
|---|---|---|---|
| 3,380,950 A * | 4/1968 | Blomeyer ..................... 524/730 |
| 3,549,583 A | 12/1970 | Nagata et al. |
| 3,632,789 A | 1/1972 | Wilhelm et al. |
| 4,096,127 A * | 6/1978 | Schurmann et al. .......... 525/454 |
| 4,184,989 A | 1/1980 | Flakus et al. |
| 4,268,426 A | 5/1981 | Williams et al. |
| 4,374,164 A | 2/1983 | Blank et al. |
| 4,491,646 A | 1/1985 | Gruber et al. |
| 4,792,580 A | 12/1988 | Doshi |
| 4,861,825 A * | 8/1989 | Ernst et al. ..................... 524/839 |
| 4,945,128 A | 7/1990 | Hille et al. |
| 5,075,370 A | 12/1991 | Kubitza et al. |
| 5,194,487 A | 3/1993 | Jacobs |
| 5,276,097 A | 1/1994 | Hoffmann et al. |
| 5,306,758 A | 4/1994 | Pellerite et al. |
| 5,314,953 A | 5/1994 | Corcoran et al. |
| 5,326,820 A | 7/1994 | Hoffmann et al. |
| 5,332,785 A | 7/1994 | Brindoepke |
| 5,344,873 A | 9/1994 | Blum |
| 5,373,050 A | 12/1994 | Morikawa et al. |
| 5,380,792 A | 1/1995 | Renk |
| 5,389,718 A | 2/1995 | Potter et al. |
| 5,391,620 A | 2/1995 | Bederke et al. |
| 5,418,301 A | 5/1995 | Hult et al. |
| 5,459,197 A | 10/1995 | Schwindt et al. |
| 5,633,307 A | 5/1997 | Das et al. |
| 5,670,600 A | 9/1997 | Nienhaus et al. |
| 5,688,859 A | 11/1997 | Schneider et al. |
| 5,723,511 A * | 3/1998 | Kazmaier et al. ............... 522/35 |
| 5,731,095 A | 3/1998 | Milco et al. |
| 5,744,542 A | 4/1998 | Martz et al. |
| 5,747,166 A | 5/1998 | Schwarte et al. |
| 5,763,528 A | 6/1998 | Barsotti et al. |
| 5,834,555 A | 11/1998 | Meisenburg et al. |
| 5,876,802 A | 3/1999 | Brunnemann et al. |
| 5,965,272 A | 10/1999 | Donnelly et al. |
| 5,985,985 A | 11/1999 | Weingart et al. |
| 5,998,876 A * | 12/1999 | Carter et al. ................... 257/778 |
| 6,130,286 A | 10/2000 | Thomas et al. |
| 6,180,180 B1 | 1/2001 | Hintze-Bruning et al. |
| 6,191,225 B1 | 2/2001 | Barkac et al. |
| 6,221,494 B1 | 4/2001 | Barsotti et al. |
| 6,326,059 B1 | 12/2001 | Lewin et al. |
| 6,428,898 B1 | 8/2002 | Barsotti et al. |
| 6,429,256 B1 | 8/2002 | Vandevoorde et al. |
| 6,432,484 B1 | 8/2002 | Corcoran et al. |
| 6,444,320 B1 | 9/2002 | Takei et al. |
| 6,462,144 B1 | 10/2002 | Ramesh et al. |
| 6,471,185 B2 | 10/2002 | Lewin et al. |
| 6,500,544 B1 | 12/2002 | Tiitu et al. |
| 6,544,593 B1 | 4/2003 | Nagata et al. |
| 6,582,685 B1 * | 6/2003 | Adams et al. ............... 424/70.11 |
| 6,586,521 B2 | 7/2003 | Blum et al. |
| 6,592,944 B1 | 7/2003 | Uhlianuk et al. |
| 6,607,833 B1 | 8/2003 | Uhlianuk et al. |
| 6,632,880 B2 | 10/2003 | Barsotti et al. |
| 6,635,314 B1 | 10/2003 | William et al. |
| 6,652,915 B1 | 11/2003 | Baumgart et al. |
| 6,664,306 B2 | 12/2003 | Gaddam et al. |
| 6,797,771 B2 | 9/2004 | Sapper et al. |

(Continued)

OTHER PUBLICATIONS

Wang et al.: Advanced Polymeric Materials; Chapter 8 "Properties of Dendrimers and Hyperbranched Polymers and Their Blends", (2003).*
Product Data Sheet for Boltorn H40, provided by Perstorp (2011).*
International Search Resort for as application PCT/US2009/049970, mailed Feb. 25, 2010, 8 pgs.
International Search Report for application PCT/US0857242, mailed Jul. 25, 2008, 12 pgs.
Molinaro, "Nanotech-based additives (materials)", Abstract, http://goliath.exnext.com/coms2/gi, downloaded Jul. 19, 2008.
Non-Final Office Action U.S. Appl. No. 12/049,075 dated Oct. 3, 2011.
Non-Final Office Action U.S. Appl. No. 12/049,075 dated Jun. 8, 2011.
Notice of Allowance U.S. Appl. No. 12/049,075 dated Mar. 7, 2012.
Product data sheet for Nanobyk-3610 provided by Byk (2011).
Product data sheet for Nanobyk-3820/3840/3860, provided by Byk (2008).
Advanced Polymeric Materials: Chapter 8: "Properties of Dendrimers and Hyperbranched Polymers and Their Blends", by Wang et al., (2003).

*Primary Examiner* — Michael J Feely
(74) *Attorney, Agent, or Firm* — Foley & Lardner LLP (57) ABSTRACT

The invention herein relates to a surface protective dendritic polymer coating compositions and to the cross-linked surface protective coatings formed thereby.

31 Claims, 1 Drawing Sheet

(56) References Cited

U.S. PATENT DOCUMENTS

| | | |
|---|---|---|
| 6,803,408 B2 | 10/2004 | Anderson et al. |
| 6,818,699 B2 | 11/2004 | Kajimaru et al. |
| 6,855,779 B1 | 2/2005 | Nagata et al. |
| 6,875,514 B2 | 4/2005 | Sormani et al. |
| 6,894,123 B2 | 5/2005 | Pelosi et al. |
| 6,897,259 B1 | 5/2005 | Cramer et al. |
| 6,927,271 B2 | 8/2005 | Grandhee |
| 6,984,693 B2 | 1/2006 | Lewin et al. |
| 6,989,421 B2 | 1/2006 | Grady |
| 6,998,154 B2 | 2/2006 | Barsotti et al. |
| 7,001,958 B2 | 2/2006 | Pelosi et al. |
| 7,067,584 B2 | 6/2006 | Rink et al. |
| 7,071,264 B2 | 7/2006 | Darling et al. |
| 7,148,310 B2 | 12/2006 | Barsotti et al. |
| 7,169,475 B2 | 1/2007 | Sormani et al. |
| 7,199,194 B2 | 4/2007 | Barsotti et al. |
| 7,217,442 B2 | 5/2007 | Wilt et al. |
| 7,220,338 B2 | 5/2007 | Chen et al. |
| 7,232,860 B2 | 6/2007 | Melchiors et al. |
| 7,268,182 B2 | 9/2007 | Sunkara et al. |
| 7,368,499 B2 | 5/2008 | Fenn et al. |
| 7,396,861 B2 | 7/2008 | Loccufier et al. |
| 7,414,091 B2 | 8/2008 | Chen et al. |
| 7,427,647 B2 | 9/2008 | Reinartz et al. |
| 7,446,155 B2 | 11/2008 | Dvornic et al. |
| 7,501,472 B2 | 3/2009 | Steidl et al. |
| 7,531,614 B2 | 5/2009 | Hille et al. |
| 7,550,527 B2 | 6/2009 | Hofacker et al. |
| 7,682,665 B2 | 3/2010 | Lenges et al. |
| 7,714,069 B2 | 5/2010 | Corcoran et al. |
| 7,732,018 B2 | 6/2010 | Lenges et al. |
| 7,737,243 B2 | 6/2010 | Adams et al. |
| 7,745,540 B2 | 6/2010 | Devadoss et al. |
| 7,754,818 B2 | 7/2010 | Devadoss et al. |
| 7,763,679 B2 | 7/2010 | Corcoran et al. |
| 7,816,451 B2 | 10/2010 | Retsch, Jr. et al. |
| 7,858,692 B2 | 12/2010 | Paquet, Jr. et al. |
| 7,888,431 B2 | 2/2011 | Huynh-Ba et al. |
| 7,906,214 B2 | 3/2011 | Seybert et al. |
| 7,910,644 B2 | 3/2011 | Saliya et al. |
| 7,919,423 B2 | 4/2011 | Feldman et al. |
| 8,206,827 B2 * | 6/2012 | Choate ...................... 428/423.1 |
| 2002/0151652 A1 | 10/2002 | Adedeji |
| 2003/0096908 A1 | 5/2003 | Heilmann et al. |
| 2003/0191231 A1 | 10/2003 | Martin et al. |
| 2003/0191236 A1 | 10/2003 | Buckmann et al. |
| 2004/0010091 A1 | 1/2004 | Paquet, Jr. et al. |
| 2004/0030031 A1 | 2/2004 | Martin et al. |
| 2004/0039098 A1 | 2/2004 | Belmares et al. |
| 2004/0043152 A1 * | 3/2004 | Barsotti et al. ................ 427/283 |
| 2004/0059082 A1 | 3/2004 | Laas et al. |
| 2004/0063851 A1 | 4/2004 | Neppl et al. |
| 2004/0092006 A1 | 5/2004 | Lindekens et al. |
| 2004/0097685 A1 * | 5/2004 | Bruchmann et al. ............ 528/44 |
| 2004/0106769 A1 | 6/2004 | Hatton et al. |
| 2004/0122172 A1 | 6/2004 | Glockner et al. |
| 2004/0143033 A1 | 7/2004 | Schwarte et al. |
| 2004/0185263 A1 | 9/2004 | Sormani et al. |
| 2004/0204524 A1 | 10/2004 | Baumgart et al. |
| 2004/0214912 A1 | 10/2004 | Rink et al. |
| 2004/0248039 A1 | 12/2004 | Sounik et al. |
| 2004/0258923 A1 | 12/2004 | Sormani et al. |
| 2005/0054786 A1 | 3/2005 | Barsotti et al. |
| 2006/0018977 A1 * | 1/2006 | Bruza et al. ................... 424/701 |
| 2006/0058414 A1 | 3/2006 | Arthur et al. |
| 2006/0058415 A1 | 3/2006 | Arthur et al. |
| 2006/0058416 A1 | 3/2006 | Brandenburg et al. |
| 2006/0058418 A1 | 3/2006 | Brandenburg et al. |
| 2006/0111477 A1 | 5/2006 | Mrvos et al. |
| 2006/0155017 A1 | 7/2006 | Devadoss et al. |
| 2006/0155021 A1 | 7/2006 | Lenges et al. |
| 2006/0216500 A1 | 9/2006 | Klun et al. |
| 2006/0222875 A1 | 10/2006 | Sormani et al. |
| 2006/0240232 A1 | 10/2006 | Faris |
| 2006/0252892 A1 * | 11/2006 | Basheer et al. ................ 525/532 |
| 2007/0040297 A1 | 2/2007 | Melanson |
| 2008/0090944 A1 | 4/2008 | Nunez et al. |
| 2008/0132631 A1 | 6/2008 | Natarajan et al. |
| 2008/0161506 A1 | 7/2008 | Martz et al. |
| 2008/0188577 A1 | 8/2008 | Schmidt et al. |
| 2008/0213544 A1 | 9/2008 | Devadoss et al. |
| 2008/0226829 A1 | 9/2008 | Choate |
| 2009/0081373 A1 | 3/2009 | Choate |

* cited by examiner

DENDRITIC POLYURETHANE COATING

RELATED APPLICATIONS

This application is a continuation-in-part of application Ser. No. 12/049,075, filed 14 Mar. 2008 (now U.S. Pat. No. 8,206,827), which in turn claims the benefit of U.S. Provisional Patent Application Ser. No. 60/918,517, filed 15 Mar. 2007, both of which are incorporated fully, including any drawings, as if set forth in their entirety herein.

FIELD

This invention relates to polymeric protective coatings for surfaces. In particular, it relates to a clear polymeric protective coating for painted surfaces such as those found in, without limitation, automotive, marine, aviation and industrial applications.

BACKGROUND

Surfaces, in particular painted surfaces exposed to the environment, may be damaged by elements such as water, snow, ice, heat, dirt, smog, humidity, bird droppings, grime, salts, chemical attack, and acid precipitation. This is particularly so with regard to painted surfaces such as those on motor vehicles, boats and airplanes. Painted surfaces may also be subject to loss of gloss from micro-scratching due to surface cleaning and from ultraviolet degradation due to long-term exposure to sunlight.

The above problems are, of course, well-known to those in industries whose products are regularly exposed to the environment. The automotive industry, for example, commonly applies protective clear coats over painted surfaces to mitigate the effects of environmental exposure on auto paint. Most clear coats used in the automotive industry are either acrylics, including thermosetting acrylic (TSA) based on polyacrylic/melamine resins, gel-coat epoxies or, increasingly, one- and two-component polyurethane liquid and powder coatings. These and other conventional coatings, however, are still quite susceptible to being scratched, chipped or otherwise damaged as the result of cleaning and maintenance, weathering, environmental conditions, manufacturing and distribution processes and, for that matter, normal use.

What is needed is an improved protective coating that protects surfaces, in particular painted surfaces, more thoroughly than currently existing technologies. The current application provides such coatings.

SUMMARY

Thus, in one aspect the present invention relates to a surface-protective coating composition, comprising:
a first component comprising:
  a dendritic polymer having a peripheral functionality of about 32 to about 128, the peripheral functionality comprising a cross-linkable functional group;
  optionally, an acrylic compound comprising the cross-linkable functional group, the acrylic compound having peripheral functionality of about 2 to about 6;
  optionally, a plurality of metal oxide nanoparticles optionally encapsulated in a polymer comprising the cross-linkable functional group and/or a fluorosurfactant comprising the cross-linkable functional group;
  optionally, a sterically hindered amine light stabilizer;
  optionally, a UV absorber;
  optionally, a cross-linking catalyst; and
  a first substantially anhydrous solvent in which the above materials are dissolved or, in the case of the nanoparticles, are dispersed; and,
a second component comprising
  a cross-linking agent, and
  a second substantially anhydrous solvent which may be the same as or different from the first substantially anhydrous solvent, wherein:
    the first and second components are mixed together to form the coating composition.

In an aspect of this invention, the first and second components are mixed together no more than about two hours prior to application of the coating to a surface.

In an aspect of this invention, the cross-linking agent is blocked, the cross-linking catalyst is blocked or both the cross-linking agent and the cross-linking catalyst are blocked; and, the first and second components are mixed together to form the coating composition at any time from the time of initial preparation of the composition to immediately prior to the deposition of the coating composition to a surface of a substrate.

In an aspect of this invention, the cross-linkable functional group is hydroxyl; the first and second substantially anhydrous solvents are polar aprotic solvents; and the plurality of metal oxide nanoparticles is not opted for.

In an aspect of this invention, the dendritic polymer is BOLTORN H-40®.

In an aspect of this invention, the first and second substantially anhydrous solvents are independently selected from the group consisting of acetone, methyl ethyl ketone, propylene glycol methyl ether acetate and mixtures thereof.

In an aspect of this invention, the first and second substantially anhydrous solvents are substantially anhydrous acetone.

In an aspect of this invention, the acrylic compound, if opted for, is an acrylic polyol.

In an aspect of this invention, the acrylic polyol is G-CURE 108BL70®.

In an aspect of this invention, the sterically hindered amine light stabilizer, if opted for, is selected from the group consisting of TINUVIN 292® and TINUVIN 123®.

In an aspect of this invention, the UV absorber, if opted for, is selected from the group consisting of TINUVIN 1130® and TINUVIN 384-2®.

In an aspect of this invention, the cross-linking agent is a polyisocyanate or a blocked polyisocyanate.

In an aspect of this invention, the polyisocyanate is DESMODUR N-3300®.

In an aspect of this invention, the blocked polyisocyanate is DESMODUR BL 3272®.

In an aspect of this invention, the cross-linking catalyst is a dibutyltin compound.

In an aspect of this invention, the dibutyltin compound is dibutyltin diacetate.

In an aspect of this invention, the cross-linking agent is a melamine formaldehyde resin.

In an aspect of this invention, the melamine formaldehyde resin is selected from the group consisting of CYMEL 303®, RESIMENE 747® and RESIMENE 755.

In an aspect of this invention, the cross-linking catalyst is a strong acid.

In an aspect of this invention, the strong acid is a sulfonic acid.

In an aspect of this invention, the sulfonic acid selected from the group consisting of p-toluenesulfonic acid and dodecylbenzyl sulfonic acid.

In an aspect of this invention, the cross-linking catalyst is a blocked strong acid.

In an aspect of this invention, the blocked strong acid is NACURE 5225®.

In an aspect of this invention the dendritic polymer is BOLTORN H-40; the acrylic compound is G-CURE 108BL-70; the plurality of metal oxide nanoparticles is not opted for; the sterically hindered amine light stabilizer is TINUVIN 292®; the UV absorber is TINUVIN 384-2®; the cross-linking catalyst is a dibutyltin catalyst; the cross-linking agent is a polyisocyanate or blocked polyisocyanate; and, the first and second substantially anhydrous solvents are independently selected from the group consisting of substantially anhydrous acetone, substantially anhydrous methyl ethyl ketone and substantially anhydrous propylene glycol methyl ether acetate.

In an aspect of this invention, in the above composition the polyisocyanate is DESMODUR N-3300®.

In an aspect of this invention, in the above composition the blocked polyisocyanate is DESMODUR BL 3272®.

In an aspect of this invention the dendritic polymer is BOLTORN H-40; the acrylic compound is G-CURE 108BL-70; the plurality of metal oxide nanoparticles is not opted for; the sterically hindered amine light stabilizer is TINUVIN 292®; the UV absorber is TINUVIN 384-2®; the cross-linking catalyst is a strong acid; the cross-linking agent is selected from the group consisting of CYMEL 303®, RESIMENE 747® and RESIMENE 755®; and, the first and second substantially anhydrous solvents are independently selected from the group consisting of substantially anhydrous acetone, substantially anhydrous methyl ethyl ketone and substantially anhydrous propylene glycol methyl ether acetate.

In an aspect of this invention, in the above composition the strong acid is selected from the group consisting of p-toluene sulfonic acid and dodecylbenzyl suflonic acid.

In an aspect of this invention, the dendritic polymer is BOLTORN H-40; the acrylic compound is G-CURE 108BL-70; the plurality of metal oxide nanoparticles is not opted for; the sterically hindered amine light stabilizer is TINUVIN 123®; the UV absorber is TINUVIN 384-2®; the cross-linking catalyst is NACURE 5225®; the cross-linking agent is selected from the group consisting of CYMEL 303®, RESIMENE 747® and RESIMENE 755®; and, the first and second substantially anhydrous solvents are independently selected from the group consisting of substantially anhydrous acetone, substantially anhydrous methyl ethyl ketone and substantially anhydrous propylene glycol methyl ether acetate.

An aspect of this invention is a surface comprising the surface-protective coating of claim 1.

An aspect of this invention is a method of forming a surface-protective coating on a surface, comprising disposing the surface-protective coating composition of claim 1. over at least a portion of the surface and curing the deposited surface-protective coating composition.

In an aspect of this invention, curing comprises heating the disposed surface-protective coating composition.

DETAILED DESCRIPTION OF THE INVENTION

BRIEF DESCRIPTION OF THE TABLES

Table 1 is a summary of laboratory tests results comparing ZYVERE®, an exemplary surface protective coating of this invention with currently available commercial coatings.

Discussion

Use of the singular herein includes the plural and vice versa unless expressly stated to be otherwise. That is, "a" and "the" refer to one or more of whatever it is that is preceded by "a" or "the." As a specific though non-limiting example taken from this application, "a cross-linkable functional group" or "the cross-linkable functional group" refers to at least two such groups (otherwise cross-linking would not be possible). By the same token, words such as, without limitation, "solvents" and "components" would refer to one solvent or component as well as to a plurality of solvents or components unless it is expressly stated or obvious from the context that such is not intended.

As used herein, a condition or event modified by "substantial" or "substantially" means that, while the condition or event may not be exactly or completely that which the unmodified word or words would suggest, the condition or event would be considered close enough by those of ordinary skill in the art to warrant designating it as being extant. Thus, for example, for the purpose of this invention, "substantially anhydrous" means that a solvent is treated so as to remove as much water as is economically possible given current technology. That is, a certain very small amount of water may remain and the solvent would still be considered by those of ordinary skill in the art to be "anhydrous."

With regard to solvents used in the preparation of surface-protective coating compositions of this invention, to be considered "anhydrous," they should contain less than 500 parts-per-million (ppm) water, preferably at present less than 250 ppm water and most preferably at present less than 100 ppm water.

Other words of approximation such as "about" or "approximately" when used to describe numerical values or ranges likewise are understood to mean that those skilled in the art would readily consider a value different from the exact number or outside the exact range to still be close enough to come within the aegis of that number or range. At the very least, "about" or "approximately" will be understood to mean±15% of a given numerical value or range starting and ending point.

The present invention relates to a surface protective coating comprising a cross-linked dendritic polymer and to methods of creating same. A dendritic polymer refers to a repeatedly branched, monodisperse, and usually highly symmetric compound formed by repetitive branching sequencing resulting in multiplicative growth of the polymer into an essentially globular three-dimensional structure. The very nature of dendritic polymers results in a large number of end groups being exposed to the environment at the outer or peripheral surface of the molecule. The "outer" or "peripheral" surface refers to the surface created by the last generation of the dendritic polymer to be added to the molecule. For the purposes of this invention, the end groups are cross-linkable functional groups and their number is referred to as the "peripheral functionality" of the dendritic polymer. Examples of cross-linkable functional groups include, without limitation, hydroxyl (—OH), sulfhydryl (—SH), amino (—NHR, where R is hydrogen (a primary amine or a hydrocarbon (a secondary amine)), carboxy (—C(O)OH), and derivatives thereof such as, without limitation, esters), aldehyde (—CHO), epoxy compounds with ethylenic (—CR═CR'—, where R and R' are independently hydrogen or hydrocarbon) groups, etc. Appropriate cross-linking agents for each of the preceding functional groups as well as many others not expressly set forth are well-known to those skilled in the art and need not be explicitly described or discussed herein. All such cross-linkable functional groups and appropriate cross-linking agents to are within the scope of this invention. In embodiments where more than one cross-linkable entity is included in a composition, the cross-linkable functional groups on each such entity must be capable of reacting with the same cross-linking agent although the exact nature of the functional groups on each entity need not necessarily be the same. For example, without limitation, hydroxyl and amino groups and both cross-linkable using polyisocyanates as the cross-linking agent so it is possible for one cross-linkable entity, e.g., a dendritic polymer, to be hydroxyl functional while another component of the composition to be amino functional. It is presently preferred, however, that the cross-linkable functional group of each cross-linkable entity of a composition herein be the same, e.g., all hydroxyl, all amino, etc.

In a presently preferred embodiment the dendritic polymer is hydroxyl functional. That is the peripheral functionality comprises hydroxyl groups such that the hydroxyl functional dendritic polymer may have any degree of peripheral hydroxyl functionality but it is presently preferred that it be from about 32 to about 128.

As used herein, "hydroxyl functional" and "hydroxyl functionality" refer to the type and number of the indicated functional group available on a multifunctional molecule for reaction with reagents that typically react with such groups. For instance, with regard to dendritic polymers, it refers to the number of functional groups available on the $n^{th}$ generation of the polymer. Thus, for example without limitation, a dendritic polymer that has a hydroxyl functionality of 64 would be understood to have 64 hydroxyl groups available on the outer or peripheral "surface" of the polymer for reaction with reagents that will react with hydroxyl groups. Thus hydroxyl functionality as used herein is a specific example of peripheral functionality.

In some embodiments, the coating also includes dispersed nanoparticles to further improve the beneficial characteristics of the coatings. The nanoparticles may be coated with or encapsulated within (the terms are used interchangeably herein) a functionalized polymer where the functional group(s) is capable of reacting with the same reagents that react with the functional groups of the dendritic polymer. In this manner the nanoparticles will participate in cross-linking and will become an integral part of the resin coating. Thus, if the presently preferred hydroxyl functional dendritic polymer is selected for use in the preparation of a coating of this invention, the polymer used to encapsulate the nanoparticles is preferably also hydroxyl functional. A presently preferred hydroxyl functional polymer for encapsulating the nanoparticles is a hydroxyl functional silicone acrylic polyol.

The coating composition herein is formed by combining two components, one of which comprises hydroxyl functional resin precursors and optional additional components and the other of which comprises a cross-linker capable of reacting with hydroxyl groups. The timing of the combination of the components determines the type of coating system that is obtained. That is, if the two components are combined, i.e., mixed together, just prior to, preferably no more than about two hours prior to, deposition of the composition on a surface, the overall coating system is, in the art, generally referred to as a two component, two-pot or 2K system. If on the other hand, the two components can be combined or mixed at any time (taking shelf-life into consideration) prior to deposition of the composition to a surface, then the presently preferred time for such combination is as a step in the initial preparation of the composition, that is, at the time of manufacture if the composition is commercial and thus the overall coating system becomes a one component, one-pot or 1K system. If the overall system is to be a 2K system, the two components, when combined, may be cured under ambient conditions or under heat cure conditions. On the other hand, when the overall system is to be a 1K system, heat cure conditions using conventional processing procedures well-known to those skilled in the art are generally used. Those skilled in the art will know which system is to be used depending on the nature of the cross-linking agent (unblocked or blocked) and/or the catalyst (unblocked strong acid or blocked strong acid) and will adjust the curing temperatures accordingly.

A presently preferred cross-linking agent is polyisocyanate, which can react with hydroxyl groups to form urethanes. Another cross-linker that may be used is a melamine formaldehyde resin, which can react with hydroxyl groups to form a variety of cross-linking groups depending on the nature of the hydroxyl-functionalized group. When using hydroxyl functional dendritic polymers and other optional hydroxyl functional entities in a composition herein and polyisocyanates as the cross-linking agent, the two components of the composition should be kept separate, in separate containers or in separate compartments of the same container and should be mixed just prior to use, preferably no more than approximately two hours before deposition onto a surface to be protected. This is the standard 2K system described above.

Examples of polyisocyanates include, without limitation, toluene diisocyanate, diphenylmethane 4,4'-diisocyanate, methylenebis-4,4'-isocyanatocyclohexane, isophorone diisocyanate, 1,6-hexamethylenediisocyanate, 1,4-cyclohexane diisocyanate, p-phenylene diisocyanate, triphenylmethane-4,4',4"-triisocyanate, tetramethylxylene diisocyanate, higher order polyisocyanates, that is compounds with more than three isocyanato groups and isocyanurates of any of the preceding. A non-limiting example of an isocyanate useful for preparation of 2K coating system using the two component coating composition herein is DESMODUR N-3300®.

If preferred, rather than including free polyisocyanates in a surface-protective composition hereof, blocked polyisocyanates can be used in which case the first and second components of the surface-protective coating composition may be mixed at any time prior to application of the coating to a surface. Of course, the actual shelf-life of such a 1K system, would be a factor in determining exactly how long before deposition to a surface to be protected the first and second components of this invention may be mixed together but such determination is well within the capability of those skilled in the art and need not be further explicated herein.

Suitable groups for use as isocyanate blocker moieties are well-known in the art and all are within the scope of this invention. Such groups include, without limitation, alcohols, lactams, oximes, malonic esters, alkylacetoacetates, triazoles, phenols and amines. A non-limiting example of a blocked isocyanate useful for preparation of either a 1K or 2K coating system using the two component coating composition herein is DESMODUR BL 3272®.

When using melamine cross-linking agents with hydroxyl functional dendritic polymers and other hydroxyl functional entities in a composition herein, either a free strong acid or a blocked strong acid may be used as the cross-linking catalyst. If the free acid is used, then the surface-protective coating composition of this invention should be formed just prior to, i.e., usually within no more than about two hours before, deposition of the composition on a surface. On the other hand, if a blocked strong acid such as NACURE 5225® is used, the two components can be mixed at any time, preferably at present as a step in the initial, usually commercial preparation of the composition, i.e., at the time of manufacture of the composition, in which case the composition can, as with the blocked polyisocyanate system described above, be marketed at a "one component" system.

Various embodiments of the present invention are suitable for use in applications including, but not limited to, automotive Original Equipment Manufacturing (OEM) finishes, automotive aftermarket refinish, automotive aftermarket custom paint, fleet market, industrial machinery and equipment, marine refinish, military, aviation and consumer product applications. The coating provides an extremely hard protective surface possessing long-term gloss retention, very high water repellency, excellent scratch resistance and dirt release properties. The coating surface can have self-cleaning properties such that when water droplets roll across a fully cured coating surface, the droplets pick up dirt and contaminants leaving behind a cleaner surface. The preceding characteristics are those that imbue a coating composition of this invention with surface protecting properties, the coating compositions being referred to as "surface-protective coating compositions."

Coatings of the present invention exhibit a number of advantages over current multipurpose protective coatings such as those used in the automotive industry. For example, the precursor coating composition, i.e., the composition that arises when the two components are mixed but have not yet been cured, has a relatively high solids content (e.g., 50-65%) and a low viscosity, which facilitates application of the composition on a substrate. Further, the cured coating possesses unique physical properties including, without limitation, long-term weather resistance, self-cleaning dirt release properties, ultra-high scratch resistance (as high as a 6H pencil hardness based on ASTM D3363), high chemical resistance (over 1500 methyl ethyl ketone (MEK) rubs without surface damage (ASTM D4752)), hydrophobicity (approach or exceed water contact angles of 90 to 100 degrees), high gloss (92.2 based on ASTM D523), excellent gloss retention, and long-term UV protection. For example, embodiments of the present invention have been shown to have higher scratch resistance than Ceramiclear® (PPG, Pittsburgh, Pa.).

The coating composition herein may be applied to the base coat of a substrate using conventional automotive paint processes including brushing, dipping, and spraying. High Volume Low Pressure (HVLP), Low Volume Low Pressure (LVLP), compressed air spraying, and electrostatic spraying equipment which are conventionally used by Original Equipment Manufacturers (OEM) can be used. After application, the coating composition may be cured by ambient air or heat curing.

The wet film build of a coating herein can range from about 1 to about 2 mils (25 to 50 microns) and the dry film build can range from about 2 to about 4 mils (50 to 100 microns) in thickness. The resulting coating produces a high-gloss surface with unique leveling, flow and sag resistance, compared to conventional coatings.

"Wet film build" refers to the precursor composition as it exists after being sprayed onto a surface but is still in liquid form. When the composition cures and becomes hard, it is referred to as "dry film build." "Leveling" is when the coating levels or becomes more flat or a glass-like surface. "Flow" is when the coating is sprayed and flows across the surface easily. "Sag resistance" is when the coating is sprayed in a vertical fashion without sagging or running. Coatings resulting from the composition herein exhibit excellent sag resistance because of the nanoparticles, which help keep the coating from sagging or running down a vertical surface when applied.

Coatings of this invention have SELF-CLEANING ACTION®, which refers to the ability of the coating to facilitate removal and reduce accumulation of dirt particles and to repel moisture from a surface that has been coated. The self-cleaning action produces a clear coating surface that is easier to clean and maintain than surfaces with conventional clear coatings.

Without being held to any particular theory, it is believed that the self-cleaning action of the coating composition might be attributable to photo-catalytic properties of zinc oxide nanoparticles at the surface of a coating of this invention. At the same time, the absorption of UV light by the zinc oxide also protects the surface from UV-induced substrate deterioration. The coatings hereof can also impart dirt release properties to a substrate surface, which reduce or prevent dirt, grime, and other contaminants from attaching to a fully cured coated surface. Additionally, undesirable accumulation or residue, such as dirt, grime, paint, or ink can be removed relatively easily by wiping. Again, without being held to any particular theory, the dirt release properties may be due at least in part to the dendritic backbone resin structure in the coating composition and the aluminum oxide and zinc oxide nanoparticles encapsulated within a polymer such as silicone polyacrylate.

Additionally, the coating composition can also restore color on paint surfaces by reversing chalking. "Chalking" occurs when a coating breaks down on the surface due to weathering or ultraviolet degradation from the sun over time. The nanoparticles and nano structured resin particles are capable of penetrating small recesses in a substrate, including degraded paint, which has become chalky over time as a result of ultraviolet degradation. The coating composition is clear and is resistant to yellowing.

Figure 1A:
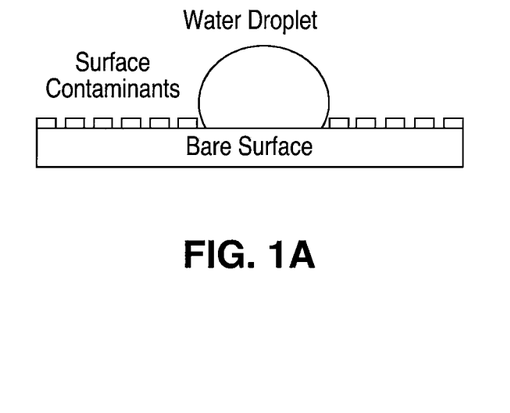
FIGS. 1A and 1B illustrate the self-cleaning action of the coating composition of the present invention.
Figure 1B:
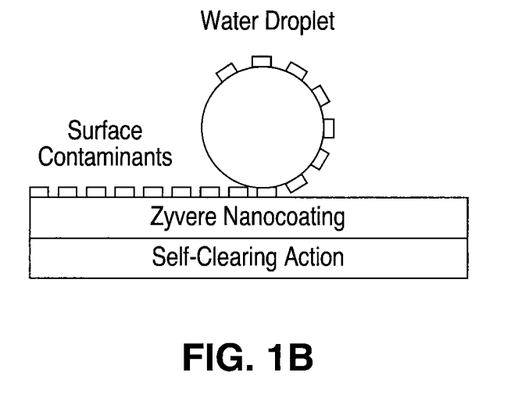

The self-cleaning properties of the coating may also arise as least in part from the hydrophobic properties of the coating composition of this invention. The hydrophobic coating repels moisture from a coated substrate. Water droplets tend to bead and roll off a fully cured composition of this invention. It is believed that the droplets pick up dirt and other surface contaminant as they move along the surface adding further to the self-cleaning properties of a coating herein. A schematic illustration of this phenomenon is shown in FIGS. 1A and 1B. FIG. 1A depicts a water droplet on a bare surface with surface contaminants. FIG. 1B depicts a water droplet on a surface coated with Zyvere® nanocoating, a commercial embodiment of the present invention. In FIG. 1B, as the droplet rolls off the coated surface, it carries with it surface contaminants from the coated surface.

The hydrophobic properties of coatings of this invention also facilitate cleaning and maintaining surfaces. For example, drying of a coated substrate is accelerated which results in reducing or eliminating "spotting." Nanoparticles of surface treated aluminum oxide further increase hydrophobicity and increase scratch resistance. The hydrophobic properties are also facilitated by the dendritic backbone resin structure and the encapsulated zinc oxide nanoparticles.

Conventional polyurethane automotive coatings are synthesized using an acrylic polyol with a hydroxyl functionality of from 2-6 hydroxyl groups. The polyol is cured with a polyisocyanate having an isocyanate functionality likewise from 2-6. A dibutyltin catalyst is generally used to speed the cure time. In addition, other additives are typically added including surface leveling agents, flow additives, pigments for coloring, and various solvents to facilitate flow, leveling, and cure time. Such polyols and cross-linking agents may be used to prepare a surface-protective coating composition of this invention.

In a presently preferred embodiment of this invention, the dendritic polymer is a dendritic polyester having a hydroxyl functionality of from about 32 to about 128. The molecular weight of the dendritic polyester can be from about 5,000 to about 10,000. In particular, BOLTORN H-40®, which has a peripheral hydroxyl functionality of 64 is presently preferred. The hydroxyl-functional dendritic polyester can be cross-linked using a polyisocyanate cross-linking agent having an isocyanate functionality of from 2 to 6. A presently preferred polyisocyanate is DESMODUR N-3300®. A dibutyltin cross-linking catalyst can be used to speed the cure time. The hydroxyl-functional dendritic polyester may also be cross-linked using a cross-linking agent having melamine formaldehyde functionality and a strong acid or blocked strong acid catalyst.

A large number of cross-linking catalysts are available for use with blocked or non-blocked polyisocyanates including, but not limited to, zinc N-ethyl-N-phenyl dithocarbamate, a metal acetonyl acetate, quaternary ammonium salts, cyclohexylamine acetate, tin octoate, stannic chloride, butyl tin trichloride, dibutyltin diacetate, dibutyltin dilaurate, bis(2-ethylhexyl)tin oxide, 1,3-diacetoxy tetrabutyl stannoxate, dibutyl dibutoxy tin, bismuth trichloride, stannous octoate, zirconium octoate, zinc nitrate, barium nitrate, lead stearate, dimethyltin dichloride, stannous naphthate and triphenyantimony dichloride. As mentioned above, however, dibutyltin cross-linking catalysts, in particular at present dibutyltin diacetate, are preferred cross-linking catalysts.

An alternative to polyisocyanate cross-linking agents are melamine formaldehyde resin cross-linking agents such as for example, without limitation, CYMEL 303®, RESIMENE 747® or RESIMENE 755. Melamine formaldehyde resin cross-linking usually requires strong acid catalysis. Presently preferred acid catalysts for use in the preparation of coatings of this invention are organic acids, in particular organic sulfonic acids such as, again without limitation, p-toluene sulfonic acid or dodecylbenzyl sulfonic acid.

To form the first component of a two component system of this invention, the dendritic polyester can be dissolved in a suitable solvent such as, without limitation, substantially anhydrous acetone, substantially anhydrous methyl ethyl ketone, substantially anhydrous methyl n-amyl ketone, substantially anhydrous ethylene or propylene glycol n-propyl ether acetate and mixtures thereof.

In some embodiments of the current invention, the final resin composition can also include, in addition to the dendritic polyester, an acrylic polyol having a hydroxyl functionality of from 2 to 6. Addition of the acrylic polyol tends to reduce the hardness and brittleness of the coating composition.

In presently preferred embodiments, the coating composition can also include metallic nanoparticles dispersed in the cross linked coating composition. Representative examples of such nanoparticles include, without limitation, aluminum oxide ($Al_2O_3$) and/or zinc oxide (ZnO) nanoparticles. Aluminum oxide nanoparticles can have a particle size in the range of about 10 to about 500 nanometers, preferably at present from about 20 to about 60 nm. Presently preferred aluminum oxide nanoparticles are commercially available NANOBYK 3610® aluminum oxide nanoparticles. Similarly, the zinc oxide nanoparticles can have a particle size in the range of about 10 to about 500 nm but preferably at present from about 50 to about 70 nm. Presently preferred zinc oxide nanoparticles are likewise commercially available as NANOBYK 3840® zinc oxide nanoparticles. The Al and Zn nanoparticles impart desirable properties to the coating composition that are described elsewhere herein. In an embodiment of this invention, the nanoparticles can be dispersed in a solvent to form a suspension. The nanoparticle suspension can then be combined with a solution containing the other precursor components described above. The suspension including the precursor composition components and the nanoparticles can then be combined with the cross-linking agent to ultimately result, after curing, in a highly cross-linked polyurethane coating containing dispersed nanoparticles.

In a presently particularly preferred embodiment of the invention, the aluminum and zinc nanoparticles are encapsulated in a polymer. The polymer preferably exhibits high adhesion to the nanoparticle. Additionally, the polymer can have functional groups that are capable of cross-linking with the selected cross-linker. For example, if the selected cross-linker is a polyisocyanate or a melamine formaldehyde, the encapsulating polymer can be a hydroxyl functional polymer. The encapsulating polymer is then capable of participating in the cross-linking reaction, thereby anchoring the nanoparticles to the dendritic polymer in the final cross-linked coating resin composition. Preferred at present is a hydroxyl functional silicone polyacrylate such as, without limitation, BYK SILCLEAN 3700®. The encapsulated aluminum oxide and/or zinc oxide nanoparticles increase scratch resistance, improve hydrophobicity and enhance the self-cleaning surface properties of the coating. It is presently preferred that a coating of this invention comprise both aluminum and zinc oxide nanoparticles.

Some embodiments of this invention also contain a hydroxyl functional fluorocarbon, in particular at present a hydroxyl functional fluorinated methacrylate polymer such as, without limitation, ZONYL 8857A® fluorosurfactant (DuPont). The ZONYL 8857A® provides added oil and water repellency and greater cleanability to the final coating. As with the other hydroxyl functional additives discussed here, the hydroxyl functional fluorocarbon will participate in the cross-linking of the final resin since it, too, will react with the selected cross-linker, be it a polyisocyanate, a melamine formaldehyde resin or another suitable cross-linker. When opted for, it is presently preferred that the about 0.2-0.3% by weight of the fluorosurfactant, based on the total resin weight, be added. In some embodiments the hydroxy functional fluorocarbon polymer is included in the coating composition together with the hydroxy functional silicone polyacrylate. In other embodiments, it is used instead of the hydroxy functional silicone polyacrylate.

In some embodiments, a hindered amine light stabilizer (HALS) can be included in the coating composition. HALS are well-known to those skilled in the art as efficient stabilizers against light-induced degradation of polymers. Presently preferred HALS are TINUVIN 292®, which may be used in any surface-protective coating composition hereof in which cross-linking is not sensitive to acid catalysis and TINUVIN 123® in compositions hereof in which cross-linking is sensitive to acid catalyst.

In some embodiments, a UV absorber can be included in the composition, examples, without limitation, of which are TINUVIN 1130® and TINUVIN 384-2®.

Each of the above additives may be included in the first component of the coating composition prior to its being combined with second component which contains the cross-linker. If one or more of the additional components is known or shown to not react with the selected cross-linker, it may be included in the second component of the two-component system. Of course, if the overall coating system is to be a 1K system, then all components can be combined in the same mixture.

The dendritic polyester increases scratch resistance, weather resistance, chemical resistance, hydrophobicity, surface hardness, and UV resistance of the cross-linked coating. A dendritic polymer has a highly branched tree-like structure the outermost branches of which can comprise a large number of a reactive functional group such as, in the present instance, multiple hydroxyl groups. These hydroxyl groups, along with those of the acrylic polyol, if included in the composition, the fluorosurfactant, if included in the composition, and the hydroxy functional polymer-coated Al and Zn nanoparticles can all react with the polyisocyanate cross-linker to create a three-dimensional resin structure. The resulting dendritic-polymer-containing resin structure produces a much more scratch resistant and weather resistant coating than conventional polyurethane automotive coatings synthesized from acrylic diols or triols and a diisocyanate or polyisocyanate cross-linker.

While the basic composition of this invention is clear and can be used to protect, without otherwise affecting the appearance of, a surface, in some embodiments of this invention, various paint pigments may be added to the resin composition to create a colored mask, a matte appearance or glow in the dark effects.

An exemplary cross-linked dendritic polyurethane clear coating of the present invention can be formed from the reaction mixture shown below. This example is by way of illustration only and is not intended nor is it to be construed as limiting the scope of this invention in any manner whatsoever.

The designations "Side A" and "Side B" refer the separate components of the coating composition herein, which in use would be contained in separate compartments and mixed just prior to use if the cross-linking agent and/or the cross-linking catalyst are not blocked. If, on the other hand, either or both of the preceding moieties of the first and second components are blocked the entire contents of the first and second components can be combined at any time prior to deposition on a surface, in fact preferably at the time of manufacture of the coating composition.

a) High solids (40-60 wt %) hydroxyl functional dendritic polyester having a hydroxyl functionality of from about 32 to about 128 (used in side A). The dendritic polyester can act as a binder for the nanoparticles if they are not coated with the hydroxy functional silicone polyacrylate and/or the fluorosurfactant. The dendritic polyester can be dissolved in acetone or other suitable solvent, which reduces its viscosity. Acetone is a VOC exempt solvent. Acetone is a colorless solvent with a high evaporation rate of 3.8 compared with n Butyl acetate of 1.

b) High solids (40-60 wt %) hydroxyl functional acrylic polyol with a hydroxyl functionality of 2 to about 6. (Used in side A).

c) Encapsulated aluminum oxide nanoparticle dispersion or suspension in a suitable solvent (e.g., without limitation, propylene glycol methyl ether acetate) with an average particle size of about 20 to about 40 nanometers. The aluminum oxide nanoparticles are encapsulated in a hydroxyl functional silicone polyacrylate having a hydroxyl functionality of from 2 to about 4 and/or a fluorosurfactant. (Used in side A)

d) Encapsulated zinc oxide nanoparticle dispersion or suspension in a suitable solvent (e.g., without limitation, propylene glycol methyl ether acetate) with an average particle size of about 50 to about 70 nm (used in side A). Zinc oxide nanoparticles are also encapsulated in the above referenced hydroxyl functional silicone polyacrylate with a hydroxyl functionality of 2 to about 4 and/or the above referenced fluorosurfactant.

e) Dibutyltin diacetate polyurethane catalyst (used in side A).

f) Sterically hindered amine light stabilizer (used in side A).

g) Hydroxyphenylbenzotriazole UV absorber (used in side A).

h) High solids (40-60 wt %) polyisocyanate crosslinker with an isocyanate functionality of 2 to about 6 (used in side B). Conventional polyisocyanates have an isocyanate (NCO) content of 15-20%. Embodiments of the present invention include using polyisocyanates with greater than 20% NCO content.

The cross-linkable composition precursors (dendritic polyester, acrylic polyol, hydroxyl functional fluorosurfactant, hydroxy functional silicone polyacrylate and polyisocyanate) are combined using processing techniques such as those described below. The composition resulting from the combined precursors is a low viscosity solution (or dispersion, if nanoparticles are present) prior to being cross-linking. The coating after cross-linking is a high cross-link density clear coating.

The overall function and properties of a coating of this invention depend on the following factors: type of binders used, binder concentration and solids level, degree and type of branching, degree of cross linking, functionality/reactivity, NCO content, NCO/OH ratio, hydroxyl content, catalyst type and concentration, choice and quality of solvents, types of additives within coating, the content of the reactive groups and the physical state of the raw materials.

In general, the higher the hydroxyl content of the particular reactant, the harder and more chemical resistant the coating composition will be. To the contrary, the lower the hydroxyl content, the softer and more flexible will be the resulting cross-linked coating composition. Generally, the higher the degree of branching, the higher the cross-linking density which results in higher chemical resistance, scratch resistance, and weather resistance. Also in general, the higher the NCO content of the polyisocyanate cross-linking agent, the harder and more chemical resistant the coating composition will be. The exemplary embodiments described herein use a high NCO content which produces a high scratch resistant coating with a high degree of flexibility and weather resistance.

The presently preferred hydroxyl functional dendritic polyester is prepared from polyhydroxy-functional esters such as, without limitation 2,2-dimethylolpropionic acid. The domain sizes of the dendritic polyester particles range from about 1 to about 20 nm. It has been observed from scanning electron microscopy (SEM), small-angle neutron scattering (SANS) and small-angle X ray scattering (SAXS) studies that there is a uniform three-dimensional distribution of these domains throughout the bulk of the resin networks. The cross-linked coating composition synthesized from the dendritic functional polyester adheres on a variety of substrates including painted metal, painted plastic surfaces, glass, some bare plastics, fiberglass, and other materials.

As mentioned previously, the term "dendritic polymer" refers to a polymer having a tree-like branching structure. To maximize cross-linking and optimize performance of the cross-linked coating, stoichiometric proportions of the reactants, i.e., hydroxyl compounds and cross-linking agents are used, e.g., stoichiometric quantities of a hydroxyl functional dendritic polyester, acrylic polyol, polyisocyanate or melamine formaldehyde resin and hydroxy functional silicone polyacrylate resin may be reacted. The selected reaction ratio can be calculated from the equivalent weight of the dendritic polyester, acrylic polyol and hydroxy functional silicone polyacrylate that are proportionate to the equivalent weight of the polyisocyanate resin used. Dendritic polymers are characterized by a highly branched structure that allows for a larger number of reactive groups than a less branched or unbranched polymer. Dendritic polymers tend to have a globular structure which results in excellent flow properties that facilitate processing even at high molecular weight. The high concentration of reactive groups facilitates customization of properties for a wide range of end uses. Dendritic polyesters have a high degree of molecular uniformity, relatively narrow molecular weight distribution, specific size and shape characteristics, and a highly-functionalized terminal surface or end-groups.

The synthesis of dendritic polymers includes a series of repetitive steps starting with a central initiator core. Each subsequent growth step represents a new "generation" of polymer with a larger molecular diameter, twice the number of reactive surface sites, and approximately double the molecular weight of the preceding generation. The exemplary dendritic polymer used in embodiments of the present invention, BOLTORN H-40®, is a fourth generation dendritic polymer, sometimes referred to as a dendrimer having a hydroxyl functionality of 64. The densely branched aliphatic structure and high functionality of dendritic polyesters allow for synthesis using solvents having low volatile organic content (VOC) and allows for rapid drying of the reaction mixture. The densely branched aliphatic structure and high functionality of dendritic polyesters also allow synthesis of a cross-linked composition having superior scratch resistance, excellent flexibility, water repellency, and superior chemical resistance.

In the preparation of a coating of this invention, the hydroxyl functional dendritic polyester is used as a cross-linked building block and as an elastomer cross-linker. Using hydroxy functional dendritic polyester cross-linked with polyisocyanates to produce the highly cross-linked polyurethanes of this invention tends to increase the glass transition temperature, Tg, of the resulting resin. Typically, the higher the glass transition temperature, the harder the coating surface as measured by such methods as the Shore-hardness test.

To maximize cross-linking and optimize performance of the cross-linked coating, stoichiometric proportions of acrylic polyol, the hydroxy functional dendritic polyester, the hydroxy functional silicone polyacrylate and/or the fluoro-surfactant may be reacted with the polyisocyanate or melamine formaldehyde resin. The reaction ratio can be calculated from the equivalent weight of the hydroxy functional dendritic polyester, acrylic polyol and the hydroxy functional silicone polyacrylate and the equivalent weight of the polyisocyanate or melamine formaldehyde resin. Acrylic resins are conventionally used for high solids clear coats over paints, metals, wood, and plastics.

Catalysts such as dibutyltin diacetate (presently preferred) and dibutyltin dilaurate are typically used in two-component polyurethane coatings to shorten the curing time, especially in those containing aliphatic polyisocyanates. Various other compounds such as dibutyltin diacetate, zinc octoate and triethylenediamine can also be used as suitable catalyst alternatives for both two-component coatings and one-component moisture-curing types.

Nanoparticles can improve the properties of coating in several ways. It is well-known, for example, that hard particles such as alumina and silica improve scratch and abrasion resistance when included in a coating. However, the use of large particles, several microns in diameter, can lead to undesirable results, for example, gloss and transparency of clear coatings can be reduced and the flexibility or toughness of the coating may be substantially reduced.

Nanoparticles, on the other hand, generally do not have these negative effects and therefore have advantages over micron-size particles. A nanoparticle can refer to a particle having a dimension between about 1 nm to about 500 nm. Certain nanoparticles, such as alumina and zinc, improve scratch resistance, but tend to have a little no effects on other coating properties. Specifically, gloss, transparency, and flexibility of a coating can be unchanged or substantially unaffected by the nanoparticles.

The improvement of coating properties arising from nanoparticles is facilitated by uniform or substantially uniform dispersion and stabilization of the nanoparticles in the coating. Nanoparticles can be obtained commercially as a well-dispersed dispersion in a liquid organic carrier. The nanodispersion can be added to the coating reaction mixture with moderate shear forces using methods known to those of skill in the art.

The dendritic polyurethane clear coating described herein utilizes aluminum and zinc metal oxide nanoparticles. In some embodiments, the particles have no or substantially no agglomeration. These metal oxide nanoparticles can be fabricated using a Physical Vapor Synthesis (PVS) Process. In this process, arc energy is applied to a solid precursor (typically metal) in order to generate a vapor at high temperature. A reactant gas is then added to the vapor, which is then cooled at a controlled rate and condenses to form nanoparticles. The nanomaterials produced by the PVS process include discrete, nonporous or substantially nonporous particles of defined crystallinity. This method typically produces particles with average sizes ranging from about 8 to about 75 nm.

The incorporation of either or both aluminum oxide and zinc oxide nanoparticles within the cross-linked polyurethane coating tends to improve scratch resistance and hardness of the coating composition. The aluminum oxide nanoparticles can have a uniform or substantially uniform particle size distribution of about 1 to about 500 nm, preferably at present about 20 to about 40 nm. The zinc oxide nanoparticles can have a uniform or substantially uniform particle size distribution of about 1 to about 500 nm, preferably at present about 50 to about 70 nm. The nanoparticles can improve scratch resistance due to reinforcement of the cross-linked composition. The nanoparticles can be incorporated throughout the polymer network by including a liquid dispersion of nanoparticles within the reaction mixture. The aluminum oxide or zinc oxide nanoparticles can be used as a dispersion in, for example without limitation, propylene glycol methyl ether acetate. Propylene glycol methyl ether acetate is a colorless solvent with an evaporation rate of 0.30 compared with n-butyl acetate at about 1. Propylene glycol methyl ether acetate has excellent solvency characteristics for the reactive components described.

In some embodiments, the nanoparticles can be surface treated or encapsulated within a hydroxy functional silicone polyacrylate resin and/or a fluorinated methacrylate polymer (surfactant). The hydroxyl functional silicone polyacrylate can cross-link into the resin network of the coating composition. The cross-linking of the encapsulation polymer can act to increase the scratch resistance and increase hydrophobicity of the surface of the coating composition. In addition, the incorporated nanoparticles produce or enhance the self-cleaning action of the coating composition. The increase in coating scratch resistance due to the nanoparticles tends to be dramatically enhanced when nanoparticles are encapsulated in the silicone polyacrylate and/or fluorinated methacrylate polymer (surfactant). The silicone polyacrylate and/or the hydroxyl functional fluorinated methyacrylate fluorosurfactant tends to improve the overall performance of the nanoparticles considerably including improving scratch and abrasion resistance, long-term hydrophobicity, and slip and mar resistance. The nanoparticles can provide long-term scratch, mar and/or abrasion resistance without significantly affecting optical clarity, gloss, color, or other physical coating properties. These particles have a low aspect ratio, high surface, and chemical purity and a controlled surface chemistry. The nanoparticles can be encapsulated with silanes, silicones or fluorosurfactants to improve dispersability. It has been experimentally observed that surface treating nanoparticles with hydroxyl-functional silicone polyacrylate or hydroxy functional fluorinated methacrylate polymer (surfactant) can dramatically enhance the performance of the surface coating.

The incorporation of the zinc oxide nanoparticles within the coating composition tends to reduce or prevent UV degradation of the coated substrate and reduces or prevents dirt from adhering to the coating surface. These effects are due a photocatalytic process in which the electrons in the zinc oxide nanoparticles become excited from UV light exposure. This photocatalytic process reduces or prevents yellowing of the substrate. The zinc oxide dispersion is diluted with propylene glycol methyl ether acetate.

As discussed above, a hydroxy functional silicone polyacrylate and/or hydroxy functional fluorinated methacrylate polymer (surfactant) can be used to surface treat the aluminum oxide and zinc oxide nanoparticles to produce a hydrophobic, anti-graffiti, and self-cleaning dirt release effect throughout the cross-linked polymer network. The hydroxy functional silicone polyacrylate resin or hydroxyl functional fluorinated methacrylate polymer (surfactant) cross-links with the other reactive components as described to produce a permanent coating with hydrophobic and dirt release properties.

EXAMPLES

The following examples are provided solely to aid in understanding the invention and are not intended, nor may they be construed, to limit the scope of this invention in any manner whatsoever.

Example 1

Example 1 is illustrates the preparation of two-component dendritic polyurethane clear coating. Part A refers to the resin component and Part B refers to the cross-linker component or, as it is sometimes interchangeably referred to in this description, "activator" component. Part A and Part B are mixed 1:1 by volume.

Step 1: Part (A)
A 200 ml round bottom enclosed flask is charged with 4-6 grams BOLTORN H40® hydroxyl functional dendritic polyester (Perstorp Specialty Chemicals, Perstorp, Sweden) and 12 grams anhydrous acetone. The material is stirred for 5 to 10 minutes.

Step 2: Part (A)
A separate 100 ml round bottom flask is charged with 20-30 grams G CURE 108BL70® (Cognis Polymers, Cincinnati, Ohio). This flask will be used as the base mixing container to develop part (A) resin.

Step 3: Part (A)
Using the 100 ml round bottom flask described in Step 2, 15-20 grams of the dendritic polyester solution described in Step 1 are added and the mixture is stirred for 40-60 seconds until the dendritic polyester solution is fully dispersed.

Step 4: Part (A)
Using the 100 ml round bottom flask described in Step 3, 0.25-0.30 grams of dibutyltin diacetate (DBTA, OMG Group, Cleveland, Ohio) is added and the mixture is stirred for 40-60 seconds until the catalyst is in solution.

Step 5: Part (A)
A separate 50 ml round bottom flask is charged with 3.5-5.5 grams NANOBYK 3610® aluminum oxide nanodispersion (BYK Chemie, Wesel, Germany, 10% aluminum oxide nanoparticles (20-40 nm) and 90% propylene glycol methyl ether acetate). The flask is then charged with 0.5-0.8 grams zinc oxide nanodispersion (NANOBYK 3840®, BYK Chemie, Wesel, Germany, 10% zinc oxide nanoparticles (50-60 nm) and 90% propylene glycol methyl ether acetate). Then 0.25 0.7 gram BYK SILCLEAN 3700® (BYK Chemie, Wesel, Germany) is added and the mixture stirred for 40-60 seconds until fully dispersed. The hydroxy functional silicone polyacrylate resin, which has a high affinity for the nanoparticles, attaches to and encapsulates the nanoparticles to create a nanoparticle core structure with a silicone polyacrylate shell.

Step 6: Part (A)
Using the 100 ml round bottom flask described in Step 4, 4-6 grams of the nanoparticle dispersion solution described in Step 5 is added and stirred for 40-60 seconds until the hydroxy functional silicone polyacrylate surface treated nanoparticle dispersion is well dispersed throughout the combined mixture.

Step 7: Part (A)
The 100 ml round bottom flask described in Step 6 is then charged with 0.3-0.5 grams sterically hindered amine light stabilizer (TINUVIN 292®, Ciba Specialty Chemicals, Tarrytown, N.Y.), then 0.8-0.3 grams hydroxyphenyl-benzotriazole UV absorber (TINUVIN 1130®, Ciba Specialty Chemicals, Tarrytown, N.Y.) are added. The mixture is stirred for 40-60 seconds until the materials are fully dispersed. Part A resin binder solution is complete. Step 7 is ready to be added at a 1:1 ratio by volume with the completed solution of Part B activator solution.

Step 8: Part (B)
A separate 100 ml round bottom flask is charged with 8-15 grams of DESMODUR N-3300® (Bayer Material Sciences, Leverkusen, Germany. DESMODUR N-100® may also be used).

Step 9: Part (B)
The 100 ml round bottom flask described in Step 8 is charged with 15-22 grams methyl ethyl ketone or acetone to reduce viscosity. The mixture is then stirred for 40-60 seconds.

Step 10: Part (B)
The 100 ml round bottom flask described in Step 9 is then charged with an additional 3-5 grams of propylene glycol methyl ether acetate with a 0.30 evaporation rate to reduce viscosity and slow the evaporation rate of the coating composition. The mixture is then stirred for 40-60 seconds until the propylene glycol methyl ether acetate is fully dispersed.

Step 11

Using the 100 ml round bottom flask described in Step 7, the entire contents (27-32 grams) of material described in step 10 are blended with 46-50 grams of material described in Step 7 and stirred for 40-60 seconds until the combined mixture is fully dispersed. Step 11 contains all of the raw materials for the final coating composition.

The following example is application information for coating based on dendritic polyurethane nanocomposite. ZYVERE® is a registered trademark corresponding to an embodiment of the coating.

A. General Instructions

Activator (Cross-linker) is moisture sensitive. Keep container closed to avoid moisture contamination. Surface should be completely dry and without moisture. ZYVERE® can be applied over conventional basecoat paints:

1. ZYVERE® Clear Nanocoating performance is proportionate to the degree of surface preparation. Surface must be very clean and super dry before coating. Remove dirt, grease, loose particles and wax with a suitable non-water cleaning agent or urethane grade solvent.

2. Surface panel should be sanded with P800 grit or finer sand paper on a random orbital sander or scuff sanded with a gray scotch-brite pad before coating.

3. Repeat step one and then thoroughly dry surface to be panted with a clean tack cloth.

4. Suitable Substrates (Must be sanded and cleaned before coating): OEM enamels, Urethane Base Coat, Single Stage Urethane, Acrylic Enamel, Acrylic Lacquer, Polycarbonate, Fiberglass, glass, ceramic and most painted plastics.

B. Directions for application of two component system:

1. To ensure proper adhesion, surface should be lightly wet sanded with 1500-2000 grit paper or 000 steel wool.

2. Surface must be very clean and dry before coating. Remove dirt, grease, loose particles and any foreign materials including wax with a suitable solvent.

3. Use in a ventilated spray booth when temperature is between 72° F. and 80° F. (19° and 27° C.) and humidity is between 50 and 65% to ensure proper curing.

4. Mix equal volume parts of ZYVERE® Resin (Part A) with ZYVERE® Activator (Part B) with a 1:1 Ratio by Volume, for example, 100 ml Part Resin+100 ml Part Activator.

5. Apply ZYVERE® mixture using a Professional HVLP/LVLP Paint Sprayer. Fluid Tip: 1.3-1.4 mm or equivalent. Air pressure: 8-10 PSI at the cap for HVLP/LVLP guns.

6. Apply one continuous medium coat, then 1 full coat (2 coats) at a gun distance of 5-7 inches. Allow 5-10 minutes between coats and wait 5-10 minutes before baking to allow for leveling and solvent evaporation.

7. Pot life of mixed components is 60 min.

8. Baking Recommended @ 150-170° F. (Metal Temp) for 30 minutes and a 2 hour cool down. If a 1K system as described herein is being used, then the recommended baking temperature is about 250° F. for about 30 minutes.

9. Air Dry Cure @ 72° F.: Dust free in 30 minutes. Handleable in 4 hours. Buffing in 48 hours @ 72° F. (Test surface hardness before buffing).

10. Clean up: Acetone, MEK, Dowanol PMA or MIBK can be used to clean overspread and sprayer clean up C. Application Parameters 1. Gun Pressure: Use 8-10 PSI at the cap for HVLP/LVLP. Adjust air pressure at the gun to 50-55 PSI for conventional.
 2. Fluid Tip: 1.3-1.4 mm or equivalent
 3. Flash Time: 5-10 minutes between coats
 4. Mixing: 1:1 Ratio by Volume
 5. Film Build: 1.4-1.8 mils per coat
 6. Final Dry Film Thickness: 2-3 mils
 7. Heat Cure Recommended:
  a. To Buff: 30 minutes @ 150-170° F. (Metal Temperature) and 2 hours at room temperature
  b. Infrared: Medium Wave for 15 minutes. Short Wave for 8 minutes
 8. Air Cure Time: Pot life is 60 minutes @ 72° F.
  a. Dust-free: 30 minutes @ 72° F.
  b. Dry-to-touch: 2 hours @ 72° F.
  c. Tape Time: 5 6 hours @ 72° F.
  d. Infrared: Medium Wave for 15 minutes. Short Wave for 8 minutes.
  e. Buffing: 48 hours @ 72° F.
 9. Application Information: Apply 1 continuous medium coat, then 1 full coat (2 coats) at a gun distance of 5-7 inches. Allow solvent evaporation and leveling between coats. Apply coats within 5-10 minutes of the first to prevent a possible recast lift. Allow 10 minutes before baking.
 10. IMPORTANT: Clean spray gun immediately after use with lacquer thinner or cleaning solvent. Avoid the use of mineral spirits.
 11. To ensure proper atomization, it is critical to check air can measure with manufactures kit.

C. Curing Schedule:

Cure times are based on the recommended dry film thickness of 1.0-1.5 mils for basecoat color and 2.0-3.0 mils for Zyvere clear nanocoating.

D. Buffing Instructions:

1. Heat Cure for 2K system (presently preferred): Allow ZYVERE® to cure for 30 minutes @ 150-170° F. (Metal Temperature) and 2 hours at room temperature before sanding or buffing.

2. Air Cure: Allow ZYVERE® to cure 48 hours under normal ambient conditions before sanding or buffing.

3. If necessary, sand with 1500 to 2000 grit sandpaper.

4. Buff by machine with polishing pad using a quality micro finishing compound, follow with a micro finishing glaze.

Example 3

ZYVERE® coatings were tested by Stonebridge Technical Services, Fenton, Mich. The results, which are summarized in Table 1, demonstrate that the coating described herein provides far superior performance compared to the closest automotive OEM aftermarket polyurethane clear coatings including PPG's CERAMICLEAR®, which uses nanoparticles in the formulation (US Published Patent Application Nos. 2003/0162876 and 2003/0162015).

The coating compositions described herein are characterized by low viscosity to facilitate spraying and to facilitate a chemical adhesion to a variety of substrates including painted metal, aluminum, painted plastic, some plastics, fiberglass, wood, epoxy, acrylic and most polyurethane based paints and powder coatings. The coating compositions are characterized by a coating viscosity measured using a No. 2 (#2) Zahn Cup from 15 18 seconds measured at room temperature (approximately 18° C.).

TABLE 1

| Sample | A | B | C |
|---|---|---|---|
| Clearcoat | Zyvere | CeramiClear | SB Acrylic Silane Melamine OEM |
| Manufacturer | Nanovere | PPG | DuPont |
| Cure Schedule | 30' @ 150° F. | 30' @ 150° F. | 30' @ 300° F. |
| Clearcoat DFT (mils) | 1.8-2.0 | 1.8-2.0 | 2.0-2.1 |
| Gloss per ASTM D523 (20°/60°) | 86.0/92.2 | 85.8/92.0 | 88.1/94.1 |
| Adhesion per ASTM D3359 Method B to White BC | 5B/100% | 5B/100% | 5B/100% |
| Pencil Hardness per ASTM D3363 | 6H | F | 4H |
| Taber Abrasion per ASTM D4060 (mg lost per 1,000 cycles) | 19.85 | 36.20 | 52.20 |
| Impact Resistance per ASTM D2794 - Initial | | | |
| Direct (inch-pounds) | 150 Fail/140 Pass | 90 Fail/80 Pass | 50 Fail/40 Pass |
| Reverse (inch-pounds) | 160 Pass (Maximum) | 120 Fail/100 Pass | 10 Fail/5 Pass |
| Impact Resisiance per ASTM D2794 - After 48 Hrs. @ 250° F. (in/lbs) | | | |
| Direct (inch-pounds) | 70 Fail/60 Pass | 60 Fail/50 Pass | 20 Fail/10 Pass |
| Reverse (inch-pounds) | 5 Fail | 5 Fail | 5 Fail |
| Flexibility per ASTM D522 | Pass ¼" | n/a | Fail ¾" Pass 1" ** |
| Chemical Spot Resistance per ASTM D1308 | | | |
| 10% Sulfuric Acid | No Effect | No Effect | No Effect |
| 10% Hydrochloric Acid | No Effect | No Effect | No Effect |
| 10% Sodium Hydroxide | No Effect | No Effect | No Effect |
| 10% Ammonium Hydroxide | No Effect | No Effect | No Effect |
| Isopropyl Alcohol | No Effect | No Effect | No Effect |
| Xylene | Slight Softening | Slight Softening | Slight Swelling |
| MEK | No Effect | No Effect | No Effect |
| Gasoline (87 Octane) | No Effect | No Effect | No Effect |
| MEK Resistance per ASTM D4752 (Double Rubs) | >1500 | 260 Fail | >1500 |

What is claimed:

1. A surface-protective coating composition, comprising:
    (1) a first component comprising:
        a globular dendritic polymer having a peripheral cross-linkable hydroxyl functionality of about 32 to about 64;
        optionally, an acrylic compound having a peripheral cross-linkable hydroxyl functionality of about 2 to about 6;
        optionally, a plurality of metal oxide nanoparticles optionally encapsulated in a cross-linkable hydroxyl functional polymer and/or a cross-linkable hydroxyl functional fluorosurfactant;
        optionally, a sterically hindered amine light stabilizer;
        optionally, a UV absorber;
        optionally, a cross-linking catalyst; and
        a first substantially anhydrous solvent in which the above materials are dissolved or, in the case of the nanoparticles, are dispersed; and
    (2) a second component comprising:
        a cross-linking agent capable of reacting with hydroxyl groups; and
        a second substantially anhydrous solvent which may be the same as or different from the first substantially anhydrous solvent,
        wherein the first and second components are mixed together to form the coating composition.

2. The surface-protective coating composition of claim 1, wherein the first and second components are mixed together no more than about two hours prior to application of the coating to a surface.

3. The surface-protective coating composition of claim 1, wherein:
    the cross-linking agent is blocked, the cross-linking catalyst is blocked or both the cross-linking agent and the cross-linking catalyst are blocked; and
    the first and second components are mixed together to form the coating composition at any time prior to deposition of the coating composition to a surface of a substrate.

4. The surface-protective coating composition of claim 1, wherein:
    the first and second substantially anhydrous solvents are polar aprotic solvents; and
    the plurality of metal oxide nanoparticles is not included.

5. The surface protective coating composition of claim 4, wherein the globular dendritic polymer has a peripheral cross-linkable hydroxyl functionality of 64.

6. The surface-protective coating composition of claim 5, wherein the first and second substantially anhydrous solvents are independently selected from the group consisting of acetone, methyl ethyl ketone, propylene glycol methyl ether acetate and mixtures thereof.

7. The surface-protective coating composition of claim 6, wherein the first and second substantially anhydrous solvents are substantially anhydrous acetone.

8. The surface-protective coating composition of claim 5, wherein the acrylic compound, if included, is an acrylic polyol.

9. The surface-protective coating composition of claim 5, wherein the surface-protective coating composition includes the sterically hindered amine light stabilizer.

10. The surface-protective coating composition of claim 5, wherein the surface-protective coating composition includes the UV absorber.

11. The surface-protective coating composition of claim 5, wherein the cross-linking agent is a polyisocyanate or a blocked polyisocyanate.

12. The surface-protective coating composition of claim 11, wherein the polyisocyanate has an isocyanate functionality of from 2 to 6.

13. The surface-protective coating composition of claim 11, wherein the blocked polyisocyanate is a blocked polyisocyanate.

14. The surface-protective coating composition of claim 11, wherein the cross-linking catalyst is a dibutyltin compound.

15. The surface-protective coating composition of claim 14, wherein the dibutyltin compound is dibutyltin diacetate.

16. The surface-protective coating composition of claim 5, wherein the cross-linking agent is a melamine formaldehyde resin.

17. The surface-protective coating composition of claim 16, wherein the cross-linking catalyst is a strong acid.

18. The surface-protective coating composition of claim 17, wherein the strong acid is a sulfonic acid.

19. The surface-protective coating composition of claim 18, wherein the sulfonic acid selected from the group consisting of p-toluenesulfonic acid and dodecylbenzyl sulfonic acid.

20. The surface-protective coating composition of claim 16, wherein the cross-linking catalyst is a blocked strong acid.

21. The surface-protective coating composition of claim 1, wherein:
the globular dendritic polymer has a peripheral cross-linkable hydroxyl functionality of 64;
the acrylic compound is included and is an acrylic polyol;
the plurality of metal oxide nanoparticles is not included;
the sterically hindered amine light stabilizer is included;
the UV absorber is included;
the cross-linking catalyst is included and is a dibutyltin catalyst;
the cross-linking agent is a polyisocyanate or blocked polyisocyanate; and
the first and second substantially anhydrous solvents are independently selected from the group consisting of substantially anhydrous acetone, substantially anhydrous methyl ethyl ketone and substantially anhydrous propylene glycol methyl ether acetate.

22. The surface-protective coating composition of claim 21, wherein the cross-linking agent is a polyisocyanate.

23. The surface-protective coating composition of claim 21, wherein the cross-linking agent is a blocked polyisocyanate.

24. The surface-protective coating composition of claim 1, wherein:
the globular dendritic polymer has a peripheral cross-linkable hydroxyl functionality of 64;
the acrylic compound is included and is an acrylic polyol;
the plurality of metal oxide nanoparticles is not included;
the sterically hindered amine light stabilizer is included;
the UV absorber is included;
the cross-linking catalyst is included and is a strong acid;
the cross-linking agent is a melamine formaldehyde resin; and
the first and second substantially anhydrous solvents are independently selected from the group consisting of substantially anhydrous acetone, substantially anhydrous methyl ethyl ketone and substantially anhydrous propylene glycol methyl ether acetate.

25. The surface-protective coating of claim 24, wherein the strong acid is selected from the group consisting of p-toluene sulfonic acid and dodecylbenzyl sulfonic acid.

26. The surface-protective coating composition of claim 1, wherein:
the globular dendritic polymer has a peripheral cross-linkable hydroxyl functionality of 64;
the acrylic compound is included and is an acrylic polyol;
the plurality of metal oxide nanoparticles is not included;
the sterically hindered amine light stabilizer is included;
the UV absorber is included;
the cross-linking catalyst is included and is a blocked strong acid;
the cross-linking agent is a melamine formaldehyde resin; and
the first and second substantially anhydrous solvents are independently selected from the group consisting of substantially anhydrous acetone, substantially anhydrous methyl ethyl ketone and substantially anhydrous propylene glycol methyl ether acetate.

27. A surface coated with the surface-protective coating composition of claim 1.

28. A method of forming a surface-protective coating on a surface, comprising:
disposing the surface-protective coating composition of claim 1 over at least a portion of the surface; and
curing the deposited surface-protective coating composition.

29. The method of claim 28, wherein curing comprises heating the disposed surface-protective coating composition.

30. The surface-protective coating composition of claim 1, wherein the globular dendritic polymer is a fourth generation dendrimer having a peripheral cross-linkable hydroxyl functionality of 64.

31. A surface-protective coating composition, comprising:
(1) a first component comprising:
a densely branched, globular dendritic polymer having a peripheral cross-linkable hydroxyl functionality of 64;
optionally, an acrylic compound having a peripheral cross-linkable hydroxyl functionality of about 2 to about 6;
optionally, a plurality of metal oxide nanoparticles optionally encapsulated in a cross-linkable hydroxyl functional polymer and/or a cross-linkable hydroxyl functional fluorosurfactant;
optionally, a sterically hindered amine light stabilizer;
optionally, a UV absorber;
optionally, a cross-linking catalyst; and
a first substantially anhydrous solvent in which the above materials are dissolved or, in the case of the nanoparticles, are dispersed; and
(2) a second component comprising:
a cross-linking agent capable of reacting with hydroxyl groups; and
a second substantially anhydrous solvent which may be the same as or different from the first substantially anhydrous solvent,
wherein the first and second components are mixed together to form the coating composition.

* * * * *